United States Patent
Palka et al.

(10) Patent No.: US 9,517,671 B2
(45) Date of Patent: Dec. 13, 2016

(54) VIBROISOLATING DEVICE WITH A NONLINEAR FORCE VS. DISPLACEMENT CHARACTERISTIC AND A MOTOR VEHICLE SUSPENSION SYSTEM COMPRISING SUCH VIBROISOLATING DEVICE

(75) Inventors: Witold Palka, Cracow (PL); Tomasz Szostek, Cracow (PL); Tomasz Lukasik, Katowice (PL)

(73) Assignee: Beijing West Industries Co, Ltd., Beijing (CN)

( * ) Notice: Subject to any disclaimer, the term of this patent is extended or adjusted under 35 U.S.C. 154(b) by 0 days.

(21) Appl. No.: 14/342,128

(22) PCT Filed: Aug. 31, 2011

(86) PCT No.: PCT/CN2011/079150
§ 371 (c)(1),
(2), (4) Date: May 2, 2014

(87) PCT Pub. No.: WO2013/029244
PCT Pub. Date: Mar. 7, 2013

(65) Prior Publication Data
US 2015/0158362 A1 Jun. 11, 2015

(51) Int. Cl.
*F16F 9/00* (2006.01)
*B60G 11/38* (2006.01)
(Continued)

(52) U.S. Cl.
CPC ............. *B60G 11/38* (2013.01); *B60G 13/003* (2013.01); *B60G 15/06* (2013.01); *B60G 15/068* (2013.01);
(Continued)

(58) Field of Classification Search
CPC ............ F16F 9/54; F16F 1/371; F16F 1/3713; F16F 1/40; F16F 1/403; F16F 1/41; F16F 3/10; F16F 3/12; F16F 1/3876; F16F 1/3835; B60G 2204/128; B60G 13/001; B60G 13/003; B60G 15/068; B60G 2202/1422; B60G 2204/41044; B60G 2204/4108; B60G 2204/45021; B60G 2202/32; B60G 2206/73
See application file for complete search history.

(56) References Cited

U.S. PATENT DOCUMENTS 3,416,783 A 12/1968 Tondato
3,601,345 A 8/1971 Johnson
(Continued)

FOREIGN PATENT DOCUMENTS

CN 1932328 A 3/2007
DE 9207732 U1 8/1992
(Continued)

OTHER PUBLICATIONS

International Search Report, 3 Pages Dated May 31, 2012.

*Primary Examiner* — Nicholas J Lane
(74) *Attorney, Agent, or Firm* — Dickinson Wright PLLC

(57) ABSTRACT

A vibroisolating device (1) comprises a substantially elastomeric core (2) configured to be connected with a first displaceable object (3) and provide with an opening (21) configured to be connected with a second displaceable object (4). In order to obtain a nonlinear force vs. displacement characteristic of the device, substantially symmetrical around a certain and adjustable nonzero displacement value, the device (1) comprises at least one Belleville spring (5) disposed on the vibration transmitting path between said first displaceable object (3) and said second displaceable object (4), which is at least partially embedded in the volume of said substantially elastomeric core (2) and surrounds said opening (21). In particular the spring (5) is preloaded while said vibroisolating device (1) is in vibrations equilibrium (Continued)

position. The invention also relates to a motor vehicle suspension, in particular an adjustable active suspension system, comprising such a vibroisolating device.

2 Claims, 4 Drawing Sheets

(51) Int. Cl.
*F16F 1/387* (2006.01)
*B60G 15/06* (2006.01)
*B60G 13/00* (2006.01)
*F16F 9/54* (2006.01)
*F16F 3/12* (2006.01)

(52) U.S. Cl.
CPC .............. *F16F 1/3876* (2013.01); *F16F 3/12* (2013.01); *F16F 9/54* (2013.01); *B60G 2202/1422* (2013.01); *B60G 2202/32* (2013.01); *B60G 2204/128* (2013.01); *B60G 2204/41* (2013.01); *B60G 2204/4108* (2013.01); *B60G 2204/41044* (2013.01); *B60G 2204/45021* (2013.01); *B60G 2206/013* (2013.01); *B60G 2206/73* (2013.01)

(56) References Cited

U.S. PATENT DOCUMENTS

| | | | |
|---|---|---|---|
| 4,248,454 A | 2/1981 | Cotter et al. | |
| 4,274,655 A | 6/1981 | Lederman | |
| 4,568,067 A | 2/1986 | Iwata | |
| 4,804,169 A | 2/1989 | Hassan | |
| 4,968,010 A | 11/1990 | Odobasic | |
| 5,150,886 A | 9/1992 | Hamberg et al. | |
| 7,005,816 B2* | 2/2006 | Hio et al. ................ | 318/375 |
| 2002/0135111 A1* | 9/2002 | Bishop ................ | B60G 13/003 |
| | | | 267/64.23 |
| 2004/0079600 A1 | 4/2004 | Schutz | |
| 2007/0144849 A1* | 6/2007 | Breun et al. ............ | 188/321.11 |
| 2009/0116772 A1* | 5/2009 | Herman et al. ............ | 384/224 |
| 2012/0280441 A1 | 11/2012 | Inoue | |

FOREIGN PATENT DOCUMENTS

| | | | | |
|---|---|---|---|---|
| DE | 10259093 A1 | 7/2004 | | |
| EP | 0133743 A2 | 3/1985 | | |
| EP | 0558115 A1 | 9/1993 | | |
| EP | 1643155 A1 | 4/2006 | | |
| GB | 1098438 | * | 1/1968 | ............... F16F 1/00 |
| JP | 5950803 A | 3/1984 | | |
| JP | 06344739 A | 12/1994 | | |

* cited by examiner the elastic spring. The bearing spring comprises at least one disk spring having an S-shaped spring constant curve. The disk spring and the elastic spring have load carrying capacities such that, after the weight of the body to be supported is applied to the flexible bearing, the spring rate of the disk spring is essentially zero and the rubber spring is essentially free of elastic tensions.

VIBROISOLATING DEVICE WITH A NONLINEAR FORCE VS. DISPLACEMENT CHARACTERISTIC AND A MOTOR VEHICLE SUSPENSION SYSTEM COMPRISING SUCH VIBROISOLATING DEVICE

CROSS REFERENCE TO RELATED APPLICATION

This application claims the benefit of PCT International Application Serial No. PCT/CN2011/079150 filed on Aug. 31, 2011, and entitled "A Vibroisolating Device with a Nonlinear Force vs. Displacement Characteristic and a Motor Vehicle Suspension System Comprising Such Vibroisolating Device".

TECHNICAL FIELD

The present invention relates to a vibroisolating device with a nonlinear force vs. displacement characteristic, as well as a motor vehicle suspension system comprising such a device. In particular the invention relates to a vibroisolating device comprising a substantially elastomeric core configured to be connected with a first displaceable object and provided with an opening configured to be connected with a second displaceable object.

BACKGROUND OF THE INVENTION

Various solutions for isolating vibrations are known from the state of art. They usually involve elastomeric materials and in automotive applications vibroisolating devices are employed usually in engine mounts and suspension module top mounts. Their general aim is to ensure low stiffness to efficiently isolate small amplitude vibrations around a certain equilibrium point, while at the same time provide high stiffness for high stroke vibrations to transmit mutual displacements of displaceable objects.

Patent specification U.S. Pat. No. 5,271,595 discloses a resilient support device having a non-linear elastic characteristic, that comprises a body of resilient material provided with two members, coupling the device with a support and a mass to be supported, which are resiliently linked together by two relatively rigid branches, which in turn are connected to each other by at least one resilient crosspiece that is prestressed in traction and is designed to buckle when the forces acting between the coupling members reach a predetermined value, wherein the deformation of the crosspiece(s) is suddenly stopped by an abutment system of relatively high stiffness. The device is applicable as an exhaust pipe support.

Patent specification U.S. Pat. No. 4,984,777 discloses a flexible bearing for supporting a body, such as an internal-combustion engine, that includes a journal bearing that may be attached to a supporting foundation and a support that may be attached to the engine. An elastic spring is connected between the journal bearing and the support while a bearing spring made of a non-creeping material is connected between the journal bearing and the support in parallel with the elastic spring. The bearing spring comprises at least one disk spring having an S-shaped spring constant curve. The disk spring and the elastic spring have load carrying capacities such that, after the weight of the body to be supported is applied to the flexible bearing, the spring rate of the disk spring is essentially zero and the rubber spring is essentially free of elastic tensions.

Other supporting systems are known for example from patent specifications U.S. Pat. No. 5,310,157, DE 3637294 A1, JP 2000-266118, JP 2009-085300 and DE 3608934 A1.

There is an object of the present invention is to provide a vibroisolating device featuring nonlinear force vs. displacement characteristic, substantially symmetrical around a certain and adjustable nonzero displacement value, which might correspond to an equilibrium point of vibrations.

Another object of the present invention is to provide a vibroisolating device which could be employed in a vehicle hydraulic damper, in particular an adjustable active suspension damper, which would effective compensate predefined preload of the damper and would feature relatively high and low stiffness respectively for high and low amplitude vibrations.

SUMMARY OF THE INVENTION

In order to accomplish the aforementioned and other objects, the invention provides a vibroisolating device of the kind mentioned in the outset which additionally comprises at least one Belleville spring disposed on the vibration transmitting path between said first and said second displaceable objects, wherein said at least one Belleville spring is at least partially embedded in the volume of said substantially elastomeric core and surrounds said opening.

The presence of the spring within the volume of the core alters the uniformity (isotropy) of the core block and differentiates its reactions with regard to opposite displacements perpendicular to the plane of the spring.

The term "elastomer" or "elastomeric" according to the present invention refers to any material capable of storing strain energy thermally within its volume.

Preferably said at least one Belleville spring is preloaded while said vibroisolating device is in its equilibrium position. In fact predefined or assumed preload of the spring enables to bring the vibroisolating device into an equilibrium position.

Preferably the device further comprises a substantially stiff support disposed within said opening of the core and provided with means for connecting said second displaceable object. Said support improves interception of vibrations of this second displaceable object.

Further the vibroisolating device according to the invention preferably comprises a housing at least partially surrounding said core and provided with means for connecting said first displaceable object. The housing enables for convenient integration of the device with the first displaceable object.

In such a case it is advantageous if said core is compressed within the housing. The compression makes it possible to define desired pretension of the core and thus the characteristic of the device as a whole.

Preferably said core is axially unsymmetrical. Such an asymmetry enables for further differentiation of the reactions of the device with regard to displacements along various directions.

Preferably said at least one Belleville spring is a conical spring, a wave spring or a perforated conical spring. Construction of the spring is another factor enabling for defining the device 3D stress-strain characteristic.

In some embodiments it may be advantageous to provide the vibroisolating device with a number of Belleville springs separated and/or forming a stack. A number of springs may be advantageous to provide an appropriate spring constant of such a set of springs if application of one spring is impossible for example due to design or geometric restrictions.

The vibroisolating device according to the invention is particularly applicable as a part of the vehicle suspension where said second displaceable object is a piston rod of a hydraulic damper.

Accordingly the invention provides also a motor vehicle suspension, and in particular an adjustable active suspension system, comprising a vibroisolating device as defined above.

BRIEF DESCRIPTION OF THE DRAWINGS

The other features of the invention shall be presented below in exemplary embodiments and in connection with the attached drawings on which:

FIG. 1 schematically illustrates a fragment of an exemplary vehicle suspension 9 attached to a vehicle chassis 3 by means of a top mount 7 and in particular by means of a number of screws 72 disposed on the periphery of the upper surface of the top mount 7. The top mount 7 is connected to a coil spring 10 and a rod 4 of a hydraulic damper 8. The tube of the damper is filled with working fluid inside of which a piston assembly attached to the piston rod 4 led outside the tube is slidably disposed. At the other end the damper tube is connected to the steering knuckle 11 supporting the vehicle wheel. All the above features are well known to those skilled in the art.

The suspension serves a dual purpose of improving the friction between the road surface and the wheels of the vehicle and at the same time of improving the overall harshness and vibroacoustic comfort for the vehicle passengers. To improve the suspension characteristics an adjustable active suspension has been recently proposed. This approach utilizes monotube dampers charged with gas, the pressure of which acts on the piston rod 4 pushing it upward. This preload along with a gravitational preload of the vehicle chassis 3 must be handled by the top mount 7.

Figure 1:
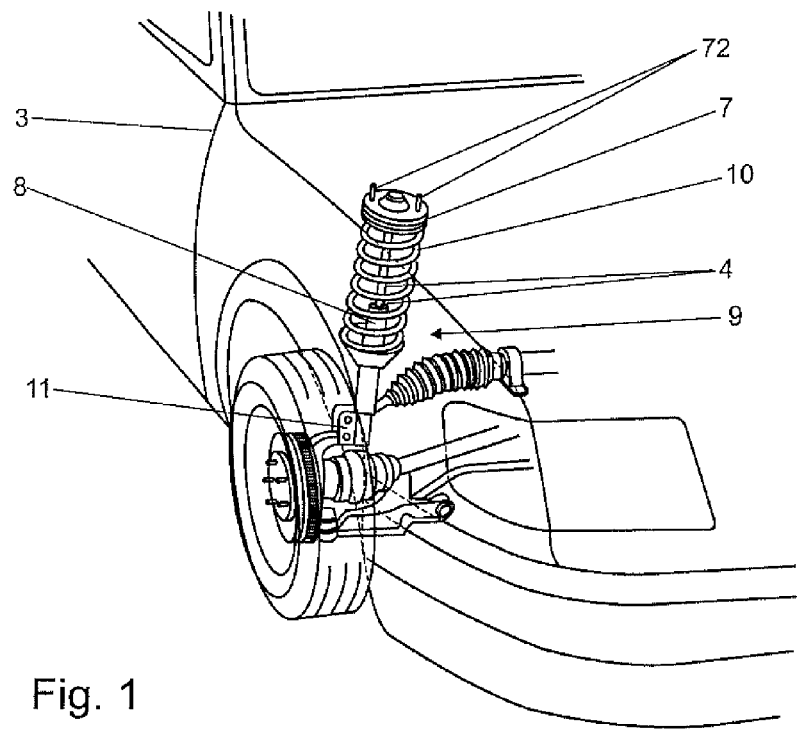
FIG. 1 schematically illustrates a front right motor vehicle suspension that has been provided with a vibroisolating device according to the invention.
Figure 2:
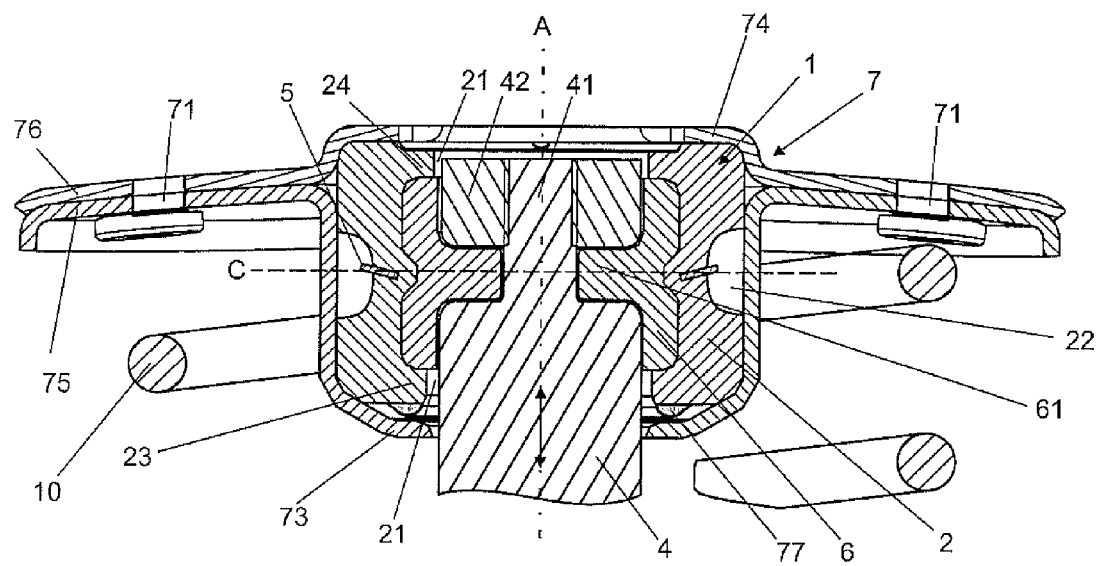
FIG. 2 is a side cross-sectional view of a top mount of the vehicle suspension shown in FIG. 1 in an unloaded position along the plane parallel to the vehicle regular driving direction.

FIG. 2 illustrates the cross-section of the top mount 7 shown in FIG. 1. The main purpose of the top mount 7 is to isolate vibrations transmitted from the piston rod 4 to the top mount 7 housing and therefrom to the vehicle chassis 3 (cf. FIG. 1). To this end the top mount 7 must provide low stiffness for small displacements of the piston rod 4, while on the other hand, for higher amplitudes of the piston rod 4 strokes, higher stiffness of the top mount 7 is required to in order to control the dynamics of the vehicle chassis 3 by appropriate transferring forces from a damper.

The top mount 7 is formed by two coaxially arranged cup-shaped, stamped covers 73 and 74 provided with circumferential flanges 75, 76 that are fixedly connected to each other. The flanges 75 and 76 are provided around the periphery with a number of vertical through openings 71 to attach the top mount to the vehicle chassis 3. Further the flanges 75 and 76 support the coil spring 10.

The covers 73, 74 form a chamber inside of which a vibroisolating device 1 is disposed. The device comprises a substantially cylindrical core 2 made of synthetic silicone rubber of predefined elastic properties and geometry, that has been pressed inside this chamber.

The core 2 is provided with an opening 21 inside of which a steel, substantially cylindrical support 6 is disposed. The support 6 is provided with a flange 61 enabling for connecting the piston rod 4 having its axial projection 41 led through the flange 61 and screwed at the other end by a nut 42.

The core 2 surrounds the support 6 with its circumferential flanges 23, 24 which improve interception of the axial displacements of the support 6 along the axis of the piston rod 4 relative to the top mount 7.

Further the core 2 is also provided with stops 77 for the compression stroke projecting equiangularly around the bottom surface of the core. Obviously it is possible to provide the top surface of the core with similar stops for the rebound stroke.

The top mount 7 shown in FIG. 2 is in an unloaded position that is before preloading the vibroisolating device 1 with the upward pressure of the piston rod 4 and downward directed weight of the vehicle chassis.

In the volume of the core 2 a Belleville conical spring 5 of predefined elastic properties and geometry has been embedded during molding the core 2. The spring 5 is arranged in such a manner that its inner circumferential edge is directed towards the damper 8 tube. The spring alters the isotropy of the elastic properties of the core along the longitudinal axis A which shall be explained later in particular with reference to FIG. 5. In this embodiment the spring 5 has not direct contact with the support 6 or the internal surface of the chamber formed by the covers 73 and 74.

Figure 3:
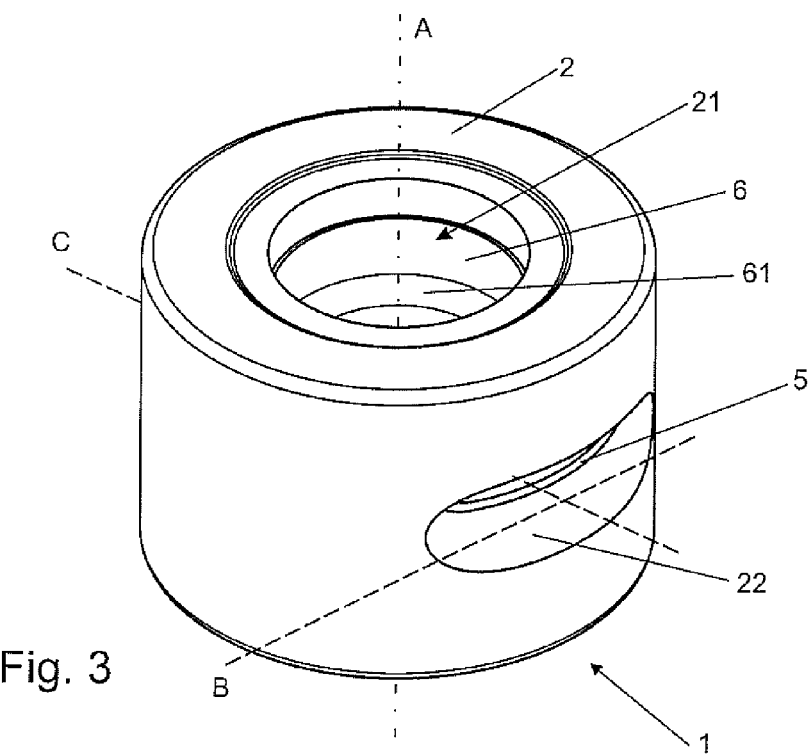
FIG. 3 is an axonometric view of a vibroisolating device shown in FIG. 1 extracted from the suspension top mount.

Further as shown in FIG. 2 and FIG. 3 the axial symmetry of the core 2 is disturbed by two cavities 22 extending along the lines B perpendicular to the axis of symmetry A of the core. The cavities also alter the isotropy of the core along the line C that is orthogonal to the lines A and B to provide lower stiffness of the device along the vehicle longitudinal chassis (i.e. along the vehicle regular driving direction) which is beneficial, e.g. while driving on a rough surface.

Figures 4A, 4B:
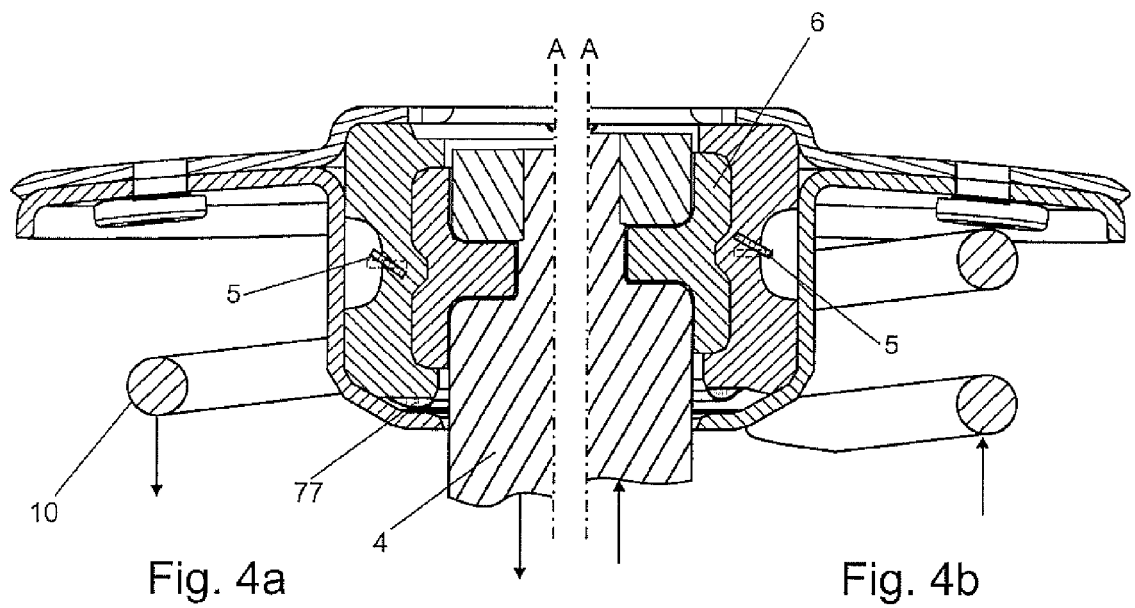
FIGS. 4a and 4b illustrate the displacement range of the top mount shown in FIG. 1 between a compression position (left side) and a rebound position (right side) with respect to the mechanically preloaded initial position (spring depicted by dashed line)

FIG. 4 illustrates operational range of an embodiment of the suspension top mount 7 shown in FIG. 1 between a compression position (FIG. 4a) and a rebound position (FIG. 4b).

After assembling the suspension damper 9 the top mount 7 is preloaded by the fraction of the weight of the vehicle and, if active, precharged suspension is employed, also by the pressure of the piston rod 4 that pushes the support 6 upward causing a deflection of the spring 5 which takes the horizontal position illustrated by dashed line on FIGS. 4a and 4b. In this embodiment this position of the spring 5 corresponds to the vibroisolating device 1 equilibrium position that is the position of the vehicle at rest, nominally loaded and standing on a horizontal flat surface.

Further movement of the rod 4 above the equilibrium position (a compression stroke, FIG. 4a) will cause the spring 5 to deflect upwardly, while the movement below the equilibrium position (a rebound stroke FIG. 4b) will cause downward deflection of the spring 5. It shall become more apparent with reference to the following description.

Figure 5A:
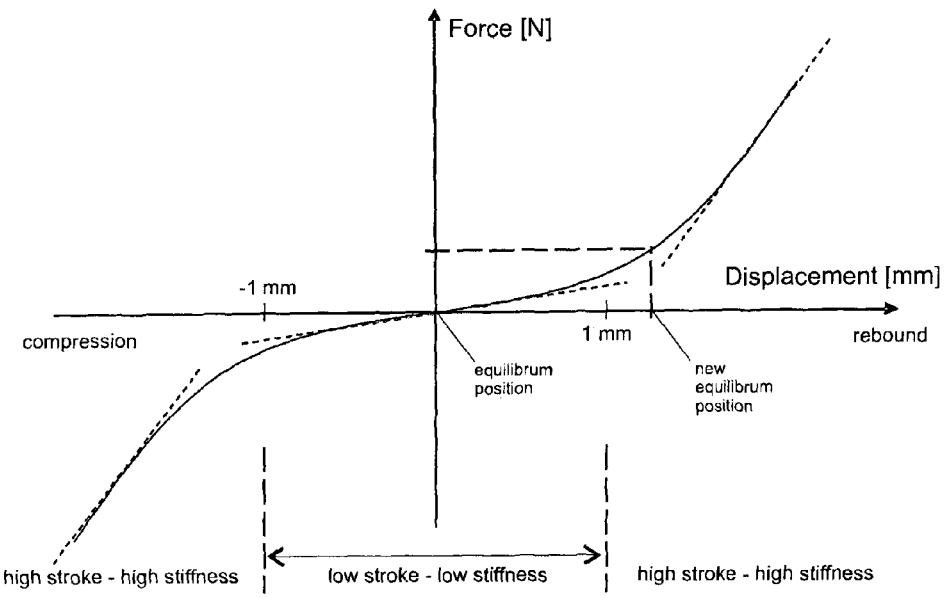
FIGS. 5a and 5b illustrate the characteristic of a force vs. displacement of an elastomeric vibroisolator known from the state of art (FIG. 5a) and a vibroisolator according to the present invention (FIG. 5b)

FIG. 5a illustrates the stiffness characteristic of a typical vibroisolator comprising solely an elastomeric core. As shown, two ranges can be distinguished within the characteristic: "low stroke-low stiffness" range that would provide good isolation for engine vibration and road harshness, and "high stroke-high stiffness" range where damper forces should be transferred for the vehicle chassis to improve the vehicle control and dynamics. The "low stroke-low stiffness" range is generated by shear of the elastomeric core section at small strokes within +/−1 mm range, while the "high stroke-high stiffness" range is generated by compression of elastomeric core above this limit.

Neglecting certain hysteresis, the stiffness characteristic of the vibroisolator is symmetrical around an equilibrium position corresponding to zero displacement between both displaceable objects connected to the vibroisolator i.e. the piston rod 4 and the vehicle body 3. Unfortunately such an equilibrium position or zero displacement rarely happens in reality since the vibroisolator is initially preloaded at least gravitationally by the weight of the body that it supports, which in turn shifts the equilibrium position upwardly into a certain position denoted as "new equilibrium position". This preload (and corresponding shift) is additionally increased in case of gas preloaded dampers of adjustable active suspension systems. Consequently vibrations (oscillations) about this new equilibrium position will no longer induce desired force response of the isolator but will generate uncomfortable high forces for small rebound (upward) displacements and undesirably small forces for small compression (downward) displacements.

Figure 5B:
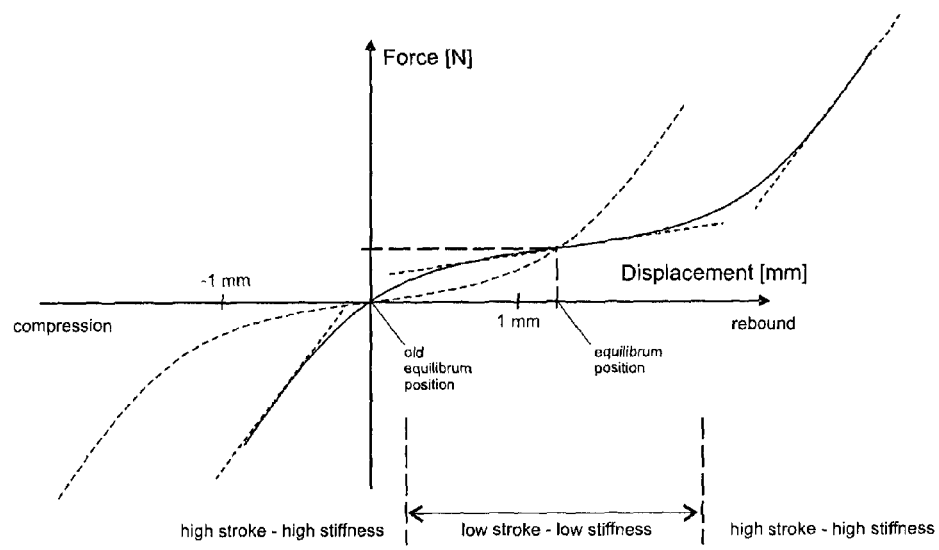

FIG. 5b illustrates the stiffness characteristic of an embodiment of a vibroisolator according to the present invention. As shown, the presence of the Belleville spring embedded in the volume of the elastomeric core shifts the whole characteristic to the equilibrium position that corresponds to the relative displacement between both displaceable objects which is generated by their relative preload. This is due to a complex three-dimensional stress state within the core since the longitudinally asymmetric spring moulded within the core generates a response while preloaded into the equilibrium position of the system. In other words the spring exceeds its stability range and act "against" the stiffness of the elastomer. Combined stiffness of the system results in characteristic shown in FIG. 5b.

Obviously by changing the elastic properties of the spring or springs moulded in the vibroisolating device it is possible to freely adjust (shift) the equilibrium position with respect to assumed preload and other factors.

Figures 6A, 6B:
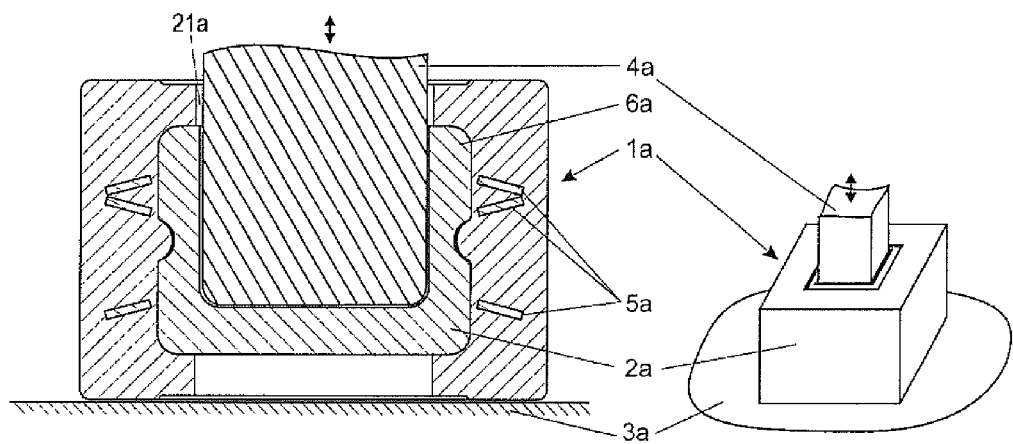
FIGS. 6a and 6b show another embodiment a vibroisolating device according to the present invention employed as a standalone support of a body, for isolating vibrations transmitted in a vertical direction and loaded gravitationally by this body, in a cross-sectional and axonometric view respectively.

FIGS. 6a and 6b illustrates another embodiment of the vibroisolating device 1a in a form of an isolating support of another vibrating device (not shown) such as an electric motor or a household appliance (refrigerator, washing machine, etc).

In this embodiment no housing surrounding the core is provided and the first displaceable object is simply the surface 3a that supports the device 1a. A leg 4a of the vibrating device (second displaceable object) is inserted into a cup-shaped support 6a disposed within an opening 21a and fixed to a rubber, cuboidal core 2a. Further the core 2a is provided with three conical spring washers 5a moulded within the core volume and arranged coaxially one above the other, wherein the two uppermost springs additionally form a stack. The parameters of the washers are chosen to compensate the gravitational preload caused by the weight of the vibrating device transmitted by the leg 4a to the base surface 3a.

Figures 7A, 7B, 7C:
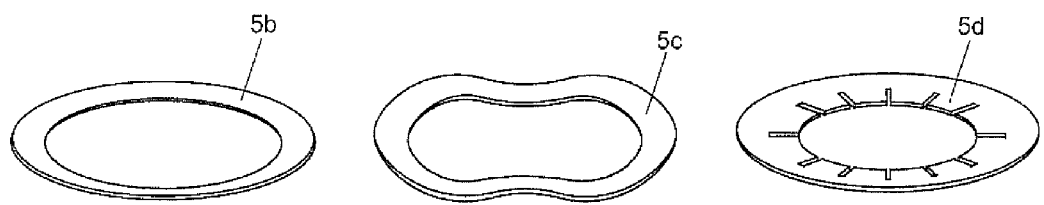
FIGS. 7a, 7b and 7c show exemplary constructions of Belleville spring applicable in the vibroisolating device according to the present invention.

FIGS. 7a, 7b and 7c shows some examples of Belleville spring i.e. a conical spring 5b, a wave spring 5c and a perforated conical spring 5d.

The parameters of the spring are preferably chosen in such a manner that after moulding within the core a preliminary load will lead to deformation of the spring to the shape of a flat washer the plane of which is substantially perpendicular to the longitudinal axis of the vibroisolating device. The above embodiments of the present invention are merely exemplary. The figures are not necessarily to scale, and some features may be exaggerated or minimized. These and other factors however should not be considered as limiting the spirit of the invention, the intended scope of protection of which is indicated in the appended claims.

What is claimed is:

1. A vibroisolating device comprising:
   a housing provided with means for connection with a first displaceable object;
   a substantially elastomeric core disposed inside said housing and provided with an opening for connection with a second displaceable object;
   at least one Belleville spring at least partially embedded in a volume of said substantially elastomeric core and disposed in surrounding relationship with said opening;
   wherein said at least one Belleville spring is configured to be preloaded while said vibroisolating device is in a vibration equilibrium position so that the stiffness characteristic of the vibroisolating device is symmetrical around the vibration equilibrium position;
   wherein said opening is defined along an axis; said elastomeric core presents an outer surface; and said outer surface defines at least one cavity axially aligned with said at least one Belleville spring and radially inward of said housing; and
   wherein said at least one Belleville spring extends into said at least one cavity.

2. A motor vehicle suspension system comprising:
   a housing provided with means for connection with a first displaceable object;
   a vibroisolating device disposed with said housing and including a substantially elastomeric core provided with an opening for connection with a second displaceable object;
   said vibroisolating device including at least one Belleville spring at least partially embedded in a volume of said substantially elastomeric core and disposed in surrounding relationship with said opening; and
   wherein said at least one Belleville spring is configured to be preloaded while said vibroisolating device is in a vibration equilibrium position so that the stiffness characteristic of the vibroisolating device is symmetrical around the vibration equilibrium position;
   wherein said opening is defined along an axis; said elastomeric core presents an outer surface; and said outer surface defines at least one cavity axially aligned with said at least one Belleville spring and radially inward of said housing; and wherein said at least one Belleville spring extends into said at least one cavity.

* * * * *